United States Patent
Nakahara

(10) Patent No.: US 7,058,294 B2
(45) Date of Patent: Jun. 6, 2006

(54) PASSIVE AUTOFOCUS SYSTEM FOR A CAMERA

(75) Inventor: Naoto Nakahara, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/815,704

(22) Filed: Apr. 2, 2004

(65) Prior Publication Data

US 2004/0202461 A1 Oct. 14, 2004

(30) Foreign Application Priority Data

Apr. 8, 2003 (JP) ........................................ 2003-104383

(51) Int. Cl.
 *G03B 13/36* (2006.01)

(52) U.S. Cl. .................. 396/104; 396/125; 348/345
(58) Field of Classification Search ................. 396/103, 396/104, 125–128; 348/345–357; 250/201.2–201.8
See application file for complete search history.

(56) References Cited

U.S. PATENT DOCUMENTS

| 5,597,999 A | * | 1/1997 | Kinba et al. ............. 250/201.7 |
| 6,108,495 A | * | 8/2000 | Takahata et al. ............. 396/89 |
| 6,178,295 B1 | | 1/2001 | Nakata et al. .............. 396/103 |
| 6,181,378 B1 | | 1/2001 | Horie et al. ................ 348/353 |

| 2003/0081137 A1 | * | 5/2003 | Yamazaki .................... 348/354 |

FOREIGN PATENT DOCUMENTS

| JP | 5-210042 | 8/1993 |
| JP | 7-43605 | 2/1995 |
| JP | 2001-141984 | 5/2001 |

OTHER PUBLICATIONS

English Language Abstract of JP 2001–141984.
English Language Abstract of JP 5–210042.

* cited by examiner

*Primary Examiner*—W. B. Perkey
(74) *Attorney, Agent, or Firm*—Greenblum & Bernstein, P.L.C.

(57) ABSTRACT

An autofocus system for a camera includes a contrast focus detector which detects a position of a focusing lens group, at which the contrast of an object image reaches a maximum as a contrast in-focus position; a phase-difference focus detector which separates the object image light bundle into two light bundles which form two object images on a light-receiving element to detect a phase difference between the two object images formed thereon, the phase-difference focus detector defining a position of the focusing lens group at which an in-focus state is obtained for the object as a phase-difference in-focus position; and a controller for moving the focusing lens group via the lens driver to the phase-difference in-focus position or the contrast in-focus position. The controller adjusts a moving range of the focusing lens group in accordance with a degree of reliability of the phase-difference in-focus position.

20 Claims, 7 Drawing Sheets

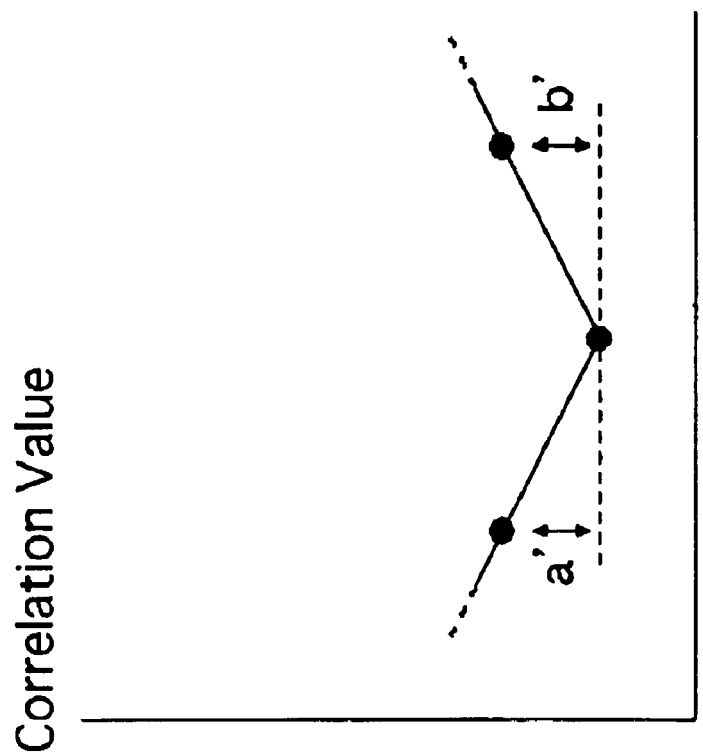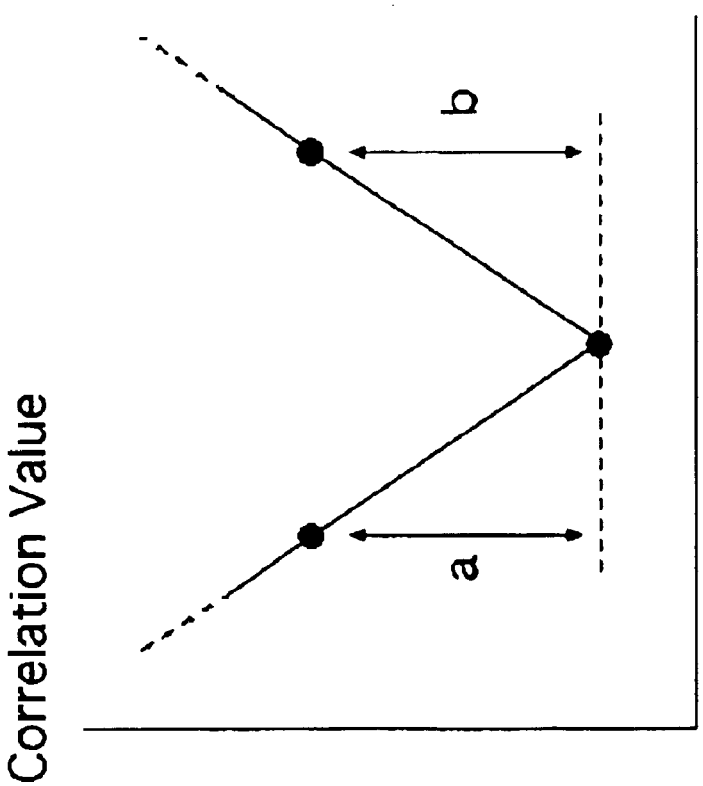
Fig. 4A
Fig. 4B

PASSIVE AUTOFOCUS SYSTEM FOR A CAMERA

BACKGROUND OF THE INVENTION

1. Field of the Invention

The present invention relates to a passive autofocus system for cameras which use both a passive phase-difference detecting method and a passive contrast detecting method.

2. Description of the Related Art

As conventional focus detecting methods used by autofocus systems for electronic cameras, the active autofocus method using triangulation and the passive autofocus method are known in the art. In addition, a phase-difference detecting method and a contrast detecting method are each known as the passive autofocus method in the art.

The active autofocus method using triangulation uses, e.g., an infrared emitter and a position sensitive detector (PSD) so that an object distance is determined by an application of triangulation, wherein the position sensitive detector receives an infrared signal which is firstly emitted by the infrared emitter and subsequently reflected by an object to be finally incident on the position sensitive detector to detect a position of the incident infrared signal. According to this active autofocus method using triangulation, the time necessary for determining an object distance is short, and the focusing lens group can be driven in a single stroke because an object distance is determined in a straightforward manner, which only requires a short time for an autofocus process. However, according to the active autofocus method using triangulation, an object distance cannot be measured with a high degree of accuracy. Moreover, the area on an object on which infrared is projected by the infrared emitter is limited to a small area because a focus detection area is small and because the infrared-projecting direction is fixed, so that there is a tendency for the foreground to be out-of-focus (i.e., the subject is out-of-focus) while the background is in focus.

In the phase-difference detecting method, a light bundle of an object image, which is passed through a photographing optical system to be formed on a reference focal plane in a predetermined focus detection area thereon, is separated into two light bundles by an exit-pupil splitting method (phase-difference detecting method) to be formed as two object images on a line sensor (which includes an array of photoelectric converting elements) to detect a phase difference between the two object images on the line sensor, and an amount of defocus is determined through a predetermined defocus operation in accordance with the detected phase difference. The focusing lens group is moved to a position at which the amount of defocus becomes minimal. The phase-difference detecting method has the advantage of having a long distance measuring range. However, the focus detection area is small and fixed.

The contrast detecting method, which uses a captured video signal in an electronic camera, uses a characteristic of the video signal such that the amount of the high frequency components of the video signal reach a maximum in an in-focus state for the object at the same distance. Namely, according to the contrast detecting method, the focusing lens group is driven in small steps to detect high frequency components of the captured video signal, and an in-focus position of the focusing lens group is determined so that the amount of the high frequency components of the captured video signal reach a maximum. This makes it possible to achieve focus with a high degree of accuracy. However, since the image contrast is detected by moving the focusing lens group in small steps, it takes a long time to determine the peak contrast intensity (in-focus position); moreover, it takes more time to determine the peak contrast intensity if the focusing lens group is positioned far away from an in-focus position thereof.

In view of the above described defects in conventional focus detecting methods, a hybrid autofocus system which uses the active autofocus method using triangulation and the contrast detecting method has been proposed in Japanese Patent Publications H05-210042 and 2001-141984, and another hybrid autofocus system which uses the phase-difference detecting method and the contrast detecting method has been proposed in Japanese Patent Publication H07-43605.

The hybrid autofocus system disclosed in Japanese Patent Publications H05-210042 and 2001-141984 firstly measures an object distance using triangulation to determine an in-focus position (temporary in-focus position) of the focusing lens group, drives the focusing lens group to a predetermined position thereof with reference to the temporary in-focus position, and subsequently drives the focusing lens group stepwise with reference to the temporary in-focus position to determine the peak contrast intensity using the contrast detecting method.

The hybrid autofocus system disclosed in Japanese Patent Publication H07-43605 firstly determines an in-focus position (temporary in-focus position) of the focusing lens group using the phase-difference detecting method to move the focusing lens group to the temporary in-focus position, and subsequently drives the focusing lens group stepwise with reference to the temporary in-focus position to determine the peak contrast intensity using the contrast detecting method.

In either of these two conventional hybrid autofocus systems, a focusing operation using the contrast detecting method is performed over a fixed range of focal settings with reference to the determined temporary in-focus position regardless of the accuracy of the initial operation determining the temporary in-focus position. Specifically, it is known that the aforementioned temporary in-focus position determining operation is performed with a high degree of accuracy for a high-contrast object, and a low degree of accuracy for a low-contrast object, according to each of the phase-difference detecting method and the contrast detecting method, both of which use an image contrast. Due to this characteristic, conventional focus detecting systems, which carry out a focusing operation using the contrast detecting method, perform a search through a superfluously wide range of focal settings for a high-contrast object. Moreover, such conventional focus detecting systems perform a search through an extremely narrow range of focal settings for a low-contrast object, which may cause the peak contrast intensity to be slightly or far out of the searching range to thereby make it impossible to determine the peak contrast intensity.

SUMMARY OF THE INVENTION

The present invention has been devised in view of the problems noted above, and provides a passive autofocus system for cameras which uses both a phase-difference detecting method and a contrast detecting method, wherein the range of detecting an image contrast by the contrast detecting method is adjusted in accordance with the result of detection by the passive phase-difference detecting method.

According to an aspect of the present invention, an autofocus system for a camera is provided, including a contrast focus detector which detects a position of a focusing lens group, at which a contrast of an object image which passes through a photographing optical system reaches a maximum while moving the focusing lens group via a lens driver, the contrast focus detector defining the position of the focusing lens group at which the contrast of the object image reaches a maximum as a contrast in-focus position; a phase-difference focus detector which separates a light bundle of the object image-into two light bundles so that the two light bundles are formed as two object images on a light-receiving element to detect a phase difference between the two object images formed thereon, the phase-difference focus detector defining a position of the focusing lens group at which an in-focus state is obtained for the object as a phase-difference in-focus position; and a controller for moving the focusing lens group via the lens driver to one of the phase-difference in-focus position and the contrast in-focus position, wherein the controller adjusts a moving range of the focusing lens group for detecting the contrast by the contrast focus detector in accordance with a degree of reliability of the phase-difference in-focus position.

According to this structure, the moving range of the focusing lens group by the contrast detecting method is adjusted to decrease as the degree of reliability in the phase-difference in-focus position obtained by the phase-difference detecting method increases. Therefore, it only takes a short time to detect the peak contrast intensity when the degree of reliability is high, while it is possible to detect the peak contrast intensity with reliability even when the degree of reliability is low.

The reliability can correspond to a minimum value of a correlation function of the two object images. The controller moves the focusing lens group to a start position away from the phase-difference in-focus position by a first moving amount in the case where the minimum value is smaller than a predetermined value, and by a second moving amount in the case where the minimum value is one of equal to and greater than the predetermined value, so as to detect the contrast while moving the focusing lens group from the start position in a direction toward the phase-difference in-focus position, the absolute value of the second moving amount being greater than the absolute value of the first moving amount.

The reliability can correspond to the inclination angles of two correlation lines between which a minimum value of a correlation function of the two object images is positioned. The controller moves the focusing lens group to a start position away from the phase-difference in-focus position by a first moving amount in the case where the sum is one of equal to and greater than a predetermined value, and by a second moving amount in the case where the minimum value is smaller than the predetermined value, to detect the contrast while moving the focusing lens group from the start position in a direction toward the phase-difference in-focus position, the absolute value of the second moving amount being greater than the absolute value of the first moving amount.

It is desirable for a direction of movement of the focusing lens group by each of the first moving amount and the second moving amount be a direction toward infinity from the phase-difference in-focus position.

It is desirable for a direction of movement of said focusing lens group by each of said first moving amount and said second moving amount be a direction toward the minimum photographing distance position from said phase-difference in-focus position.

The phase-difference focus detector can be provided as a unit which is independent of the contrast focus detector.

In another embodiment, an autofocus system is provided, including a contrast focus detector which detects a position of a focusing lens group, at which a contrast of an object image which passes through a photographing optical system reaches a maximum while moving the focusing lens group via a lens driver, the contrast focus detector defining the position of the focusing lens group at which the contrast of the object image reaches a maximum as a contrast in-focus position; a phase-difference focus detector which separates a light bundle of the object image into two light bundles so that the two light bundles are formed as two object images on a light-receiving element to detect a phase difference between the two object images formed thereon, the phase-difference focus detector defining a position of the focusing lens group at which an in-focus state is obtained for the object as a phase-difference in-focus position; and a controller for moving the focusing lens group via the lens driver to one of the phase-difference in-focus position and the contrast in-focus position, wherein the controller adjusts a distance from a position of the focusing lens group to the phase-difference in-focus position, for detecting the contrast by the contrast focus detector in accordance with a degree of reliability of the phase-difference in-focus position.

In another embodiment, an autofocus method is provided, including detecting a position of a focusing lens group, at which a contrast of an object image which passes through a photographing optical system reaches a maximum while moving the focusing lens group; defining the position of the focusing lens group at which the contrast of the object image reaches a maximum as a contrast in-focus position; separating a light bundle of the object image into two light bundles so that the two light bundles are formed as two object images on a light-receiving element to detect a phase difference between the two object images formed thereon; defining a position of the focusing lens group at which an in-focus state is obtained for the object as a phase-difference in-focus position; and commencing a lens driving operation, wherein a distance from the phase-difference in-focus position is controlled in accordance with a degree of reliability of the phase-difference in-focus position.

The present disclosure relates to subject matter contained in Japanese Patent Application No. 2003-104383 (filed on Apr. 8, 2003) which is expressly incorporated herein by reference in its entirety.

BRIEF DESCRIPTION OF THE DRAWINGS

The present invention will be described below in detail with reference to the accompanying drawings in which:

FIG. 4A is a graph showing inclinations of two straight lines representing the correlation values shown in FIG. 2B;

FIG. 4B is a graph showing inclinations of two straight lines representing the correlation values shown in FIG. 3B;

DESCRIPTION OF THE PREFERRED EMBODIMENT

Figure 1A:
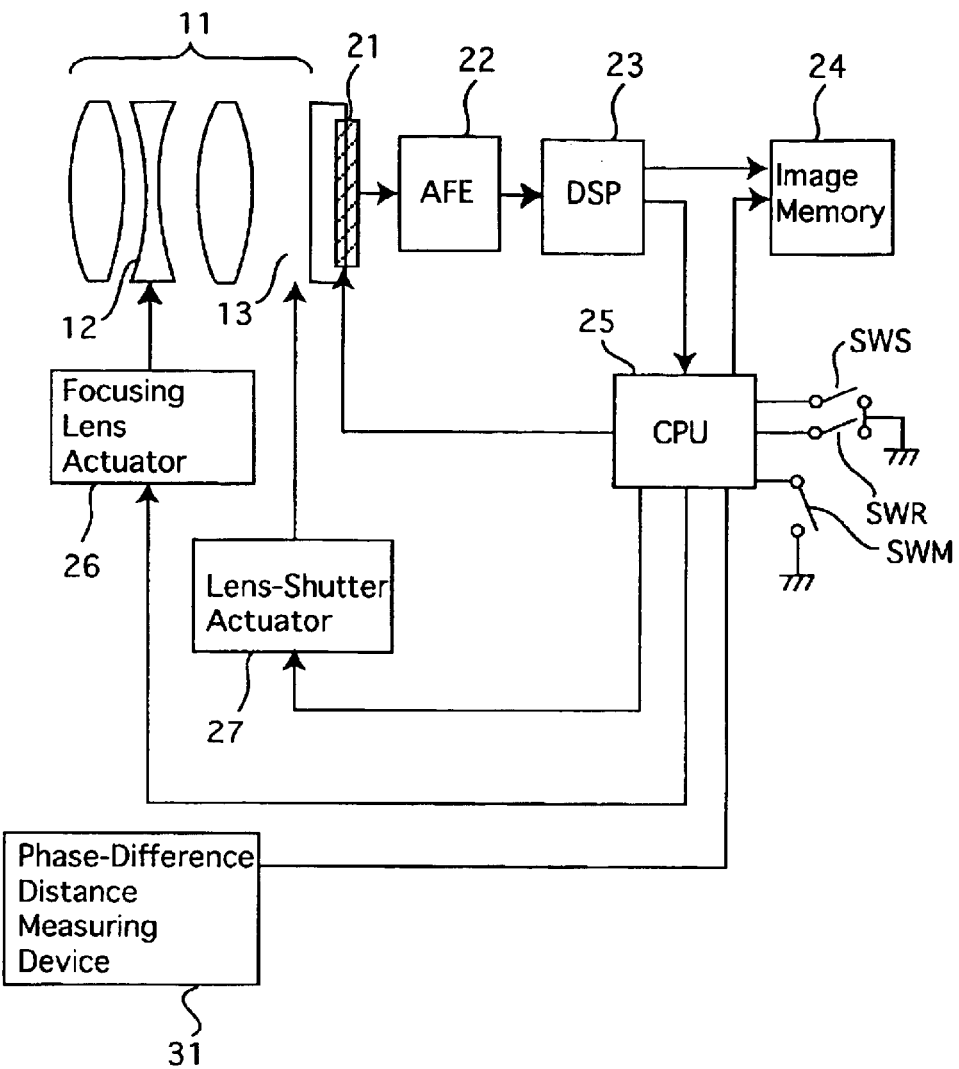
FIG. 1A is a block diagram of an embodiment of a passive autofocus system for a lens shutter type of electronic camera according to the present invention.

FIG. 1A shows a schematic circuit diagram of an embodiment of a passive autofocus system for a lens shutter electronic camera according to the present invention. The electronic camera is provided with a photographing lens 11, a CCD image sensor 21, an AFE (analog front end) 22, a DSP (digital signal processor) 23, an image memory 24 and a CPU 25. The CCD image sensor 21, which serves as an image pick-up device, receives a light bundle of an object image which is passed through the photographing lens 11 to convert the incident light of the object image into an electrical picture signal. The AFE 22, which serves as an image processor, processes the picture signal output from the CCD image sensor 21. The electronic camera is provided on a camera body thereof with a release button (not shown), and is further provided with a photometering switch SWS and a release switch SWR which are interconnected with the release button. The photometering switch SWS and the release switch SWR are connected to the CPU 25. The release button is interconnected with the photometering switch SWS and the release switch SWR in a manner so that the photometering switch SWS is turned ON if the release button is depressed by a half step, and so that the release switch SWR is turned ON while the photometering switch SWS is maintained ON if the release button is depressed by a full step. "SWM" shown in FIG. 1A represents a main power switch of the electronic camera. Upon the main power switch SWM being turned ON, the CPU 25 starts operating so that the electronic camera goes into action to thereby make it possible to carry out an autofocus process, an imaging process, and other processes.

The photographing lens 11 is provided therein with a focusing lens group 12 and a lens shutter unit 13. The focusing lens group 12 is guided along an optical axis thereof to be freely movable there along. The moving operation of the focusing lens group 12 along the optical axis thereof is controlled by the CPU 25 via a focusing lens actuator (lens driver) 26 for the focusing lens group 12. The lens shutter unit 13 operates as a shutter and also as a diaphragm. Respective operations of the lens shutter unit 13 as a shutter and a diaphragm are controlled by the CPU 25 via a lens-shutter actuator 27.

The picture signal output from the CCD image sensor 21 is amplified, sampled, held and subsequently converted into a digital picture signal by pixel by the AFE 22 to be output to the DSP 23. The DSP 23 performs image processing (e.g., white-balance adjustment, blanking, clamping, and gamma correction) on the input digital picture signal, and writes the processed digital picture signal into the image memory 24. The image memory 24 is a cache memory. A nonvolatile memory card (not shown) serving as another image memory is removably inserted into the electronic camera.

The DSP 23 is provided therein with a digital filter (not shown) serving as a high-pass filter, a full-wave detection circuit and an integrating circuit. The digital filter samples high frequency components of the input digital picture signal, and arranges positive and negative components of the high frequency components in one direction to demodulate and integrate the positive and negative components. This integrated and demodulated signal is output to the CPU 25 as contrast data.

Figure 6A:
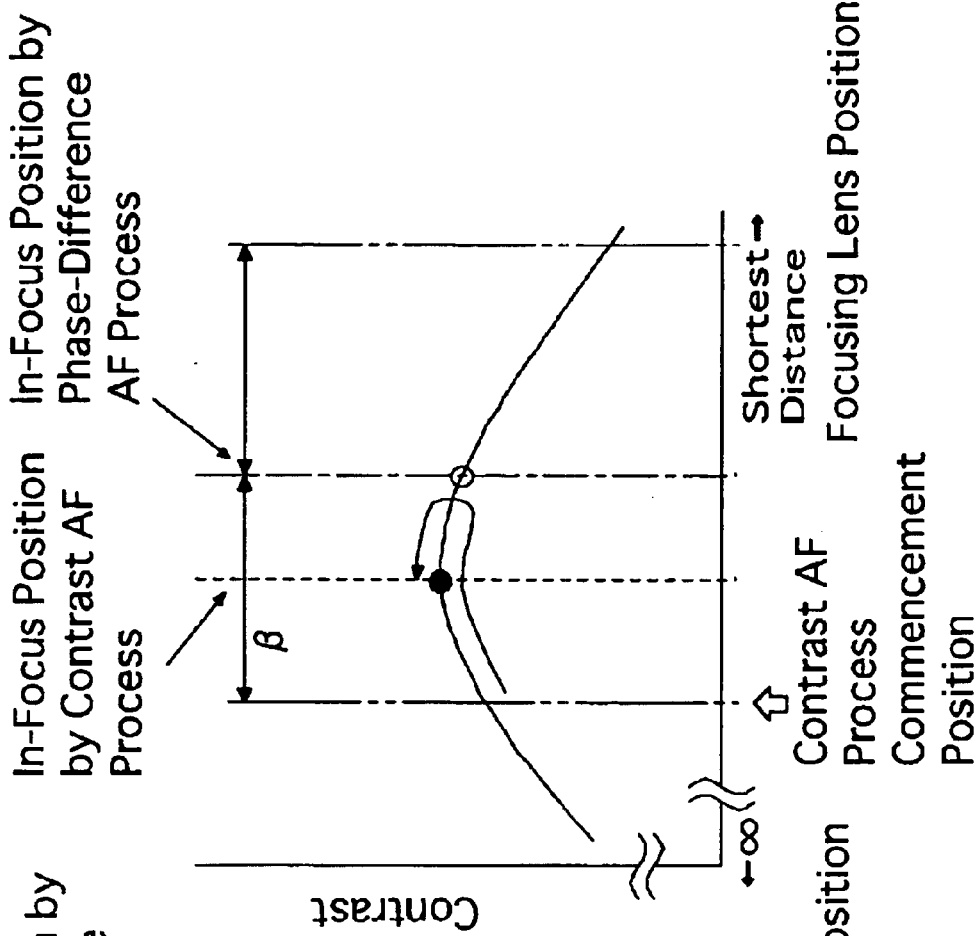
FIG. 6A shows a line graph showing a relationship between an in-focus position determined by the phase-difference detecting method, and a moving path of the focusing lens group and an in-focus position thereof determined by the contrast detecting method when image contrast is high.
Figure 6B:
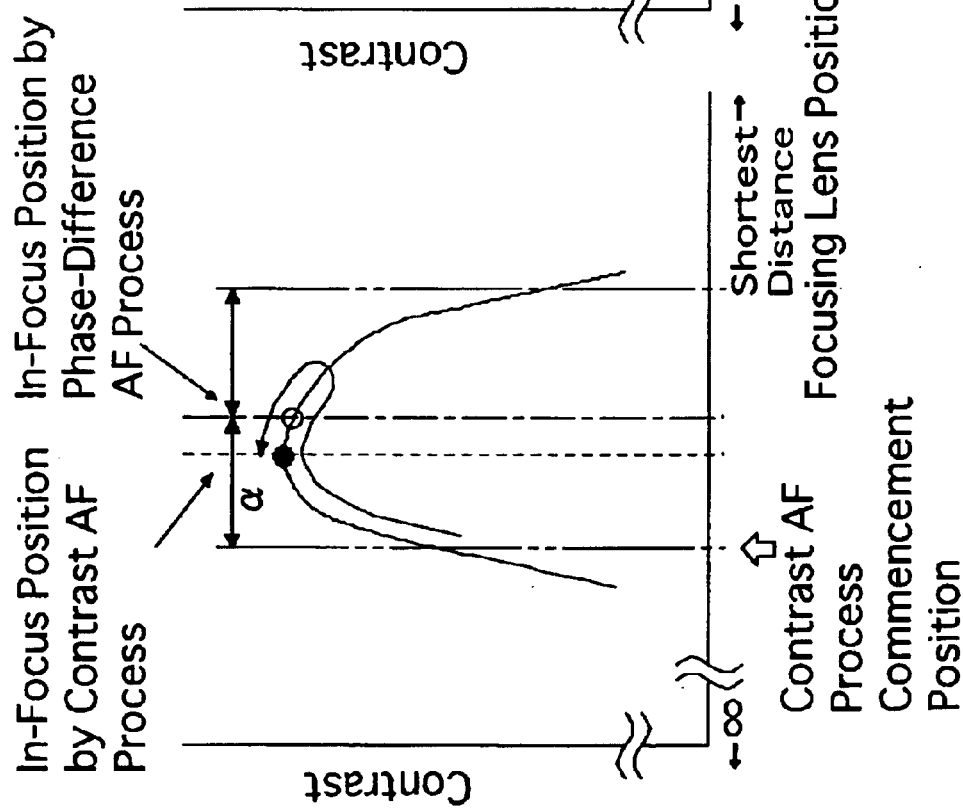
FIG. 6B shows a line graph showing a relationship between an in-focus position determined by the phase-difference detecting method, and a moving path of the focusing lens group and an in-focus position thereof determined by the contrast detecting method when contrast image is low.

The CPU 25 inputs the contrast data while driving the focusing lens group 12 stepwise to search the peak contrast intensity. Subsequently, the CPU 25 defines a position of the focusing lens group 12 at which the peak contrast intensity is obtained as a contrast in-focus position of the focusing lens group 12, and moves the focusing lens group 12 to this contrast in-focus position. FIGS. 6A and 6B show moving paths of the focusing lens group 12 by the contrast detecting method. In this case, the photographing lens 11, the CCD image sensor 21, the AFE 22, the DSP 23, the CPU 25, the focus lens actuator 26 and the focusing lens group 12 constitute a contrast focus detector.

Figure 1B:
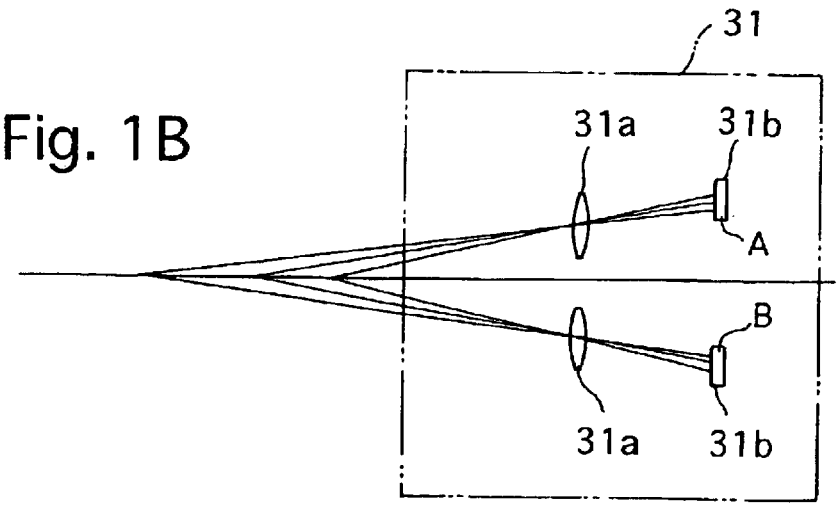
FIG. 1B is a schematic diagram of a distance measuring sensor provided in the lens-shutter electronic camera shown in FIG. 1A.

The electronic camera is provided with a phase-difference distance measuring device (phase-difference focus detector) 31 as a phase-difference focus detector provided independently of the aforementioned contrast detector. The phase-difference distance measuring device 31 is a conventional phase-difference detection type AF unit. FIG. 1B shows a schematic structure of the phase-difference distance measuring device 31. The phase-difference distance measuring device 31 is provided with a pair of separator lenses 31a and a corresponding pair of line sensors 31b. The image observed through each of the distance measurement zones is respectively divided into two by the pair of separator lenses to be formed as two separate images on the corresponding pair of line sensors 31b. Each line sensor 31b is provided with an array of photodiodes (photoelectric conversion elements), the details thereof not being shown. Each photodiode of each line sensor 31b receives the split object light bundles, converts the light into an electric charge and accumulates (integrates) the electric charges. The electric charges obtained by the integration process at each photodiode of each line sensor 31b are successively converted to a voltage for each pixel and is output as picture signal to the CPU 25. One of the pair of line sensors 31b is a reference (area) line sensor A, and the other of the pair of line sensors 31b is a comparison (area) line sensor B. The output from the reference line sensor A is used as the reference area thereof and the output from the comparison line sensor B is used as a comparison area thereof in a correlation calculation.

The CPU 25 calculates the absolute value of the difference between two picture signals of the two separate object images a predetermined number of times by shifting pixels to determine correlation values between the two separate object images, and determines a phase difference (the amount of separation) between the two separate object images from the correlation values. Subsequently, the CPU 25 calculates the distance to the object from the phase difference, and determines an in-focus position of the focusing lens group 12 at which the object at the calculated distance is brought into focus. Upon this determination of the in-focus position of the focusing lens group 12, the CPU 25 drives the focusing lens actuator 26 to move the focusing lens group 12 to the determined in-focus position thereof.

Figure 2A:
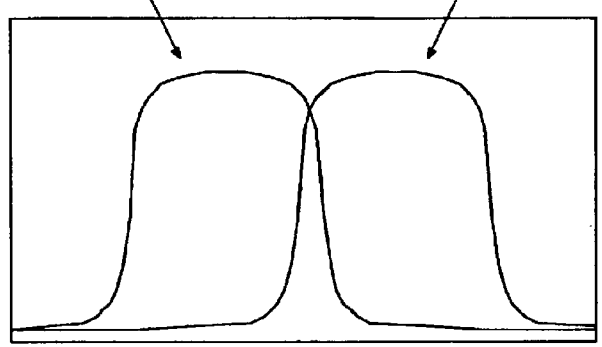
FIG. 2A is a graph showing two picture signals for a high contrast object which are respectively obtained from a reference area and a comparison area of a line sensor.
Figure 2B:
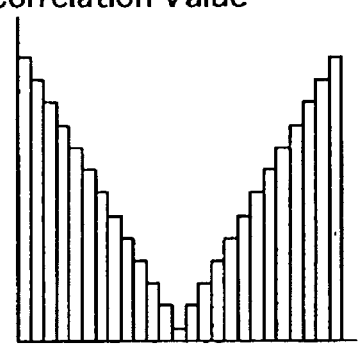
FIG. 2B is a bar graph showing the correlation values between the two picture signals shown in FIG. 2A.
Figure 3A:
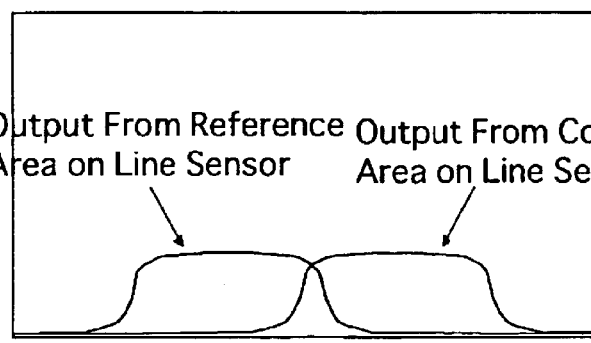
FIG. 3A is a graph showing two picture signals for a low contrast object which are respectively obtained from the reference area and the comparison area.
Figure 3B:
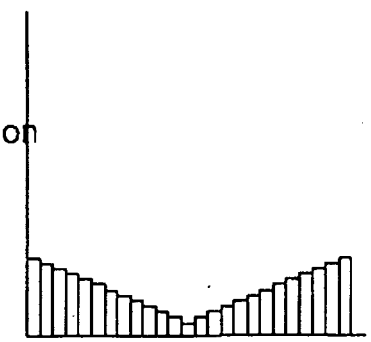
FIG. 3B is a bar graph showing the correlation values between the two picture signals shown in FIG. 3A.

FIGS. 2A through 4B show picture signals obtained from the reference area and the comparison area of the line sensor by the phase-difference detecting method, and correlation values and associated states which are obtained from the picture signals. FIG. 2A is a graph showing two picture signals for a high contrast object which are respectively obtained from the reference area and the comparison area, and FIG. 2B is a bar graph showing the correlation values between the two picture signals shown in FIG. 2A. FIG. 3A is a graph showing two picture signals for a low contrast object which are respectively obtained from the reference area and the comparison area, and FIG. 3B is a bar graph showing the correlation values between the two picture signals shown in FIG. 3A. FIG. 4A is a line graph showing inclinations of two straight lines representing the correlation values shown in FIG. 2B, and FIG. 4B is a line graph showing inclinations of two straight lines representing the correlation values shown in FIG. 3B.

In the graphs showing correlation values in FIGS. 2B, 3B, 4A and 4B, the root of the V-shaped valley corresponds to the peak contrast intensity representing an in-focus position (contrast in-focus position) of the focusing lens group 12. The reliability in this contrast in-focus position is greater as the minimum correlation value is smaller (i.e., as the root of the V-shaped valley like graph is lower) and also as the inclinations of the two straight lines (correlation lines) which form the V-shaped valley like graph are greater. In FIG. 4A, which shows a line graph representing correlation values for a high contrast object, the inclination of one straight line (the left straight line in FIG. 4A) is represented by a, and the inclination of the other straight line (the right straight line in FIG. 4A) is represented by b. In FIG. 4B, which show a line graph representing correlation values for a low contrast object, the inclination of one straight line (the left straight line in FIG. 4B) is represented by a', and the inclination of the other straight line (the right straight line in FIG. 4B) is represented by b'. Each of these four inclinations a, b, a' and b' increases as the absolute value thereof increases.

Conventionally, in a focus detection system using a phase-difference detecting method, it is known that error between a determined in-focus position and an actual in-focus position is smaller in the case where the reliability of data of an in-focus position is high than that in the case where the reliability of data of an in-focus position is low. In addition, an in-focus position can be detected with a higher degree of accuracy by the contrast detecting method than that by the phase-difference detecting method even if the image contrast is somewhat low.

Figure 5A:
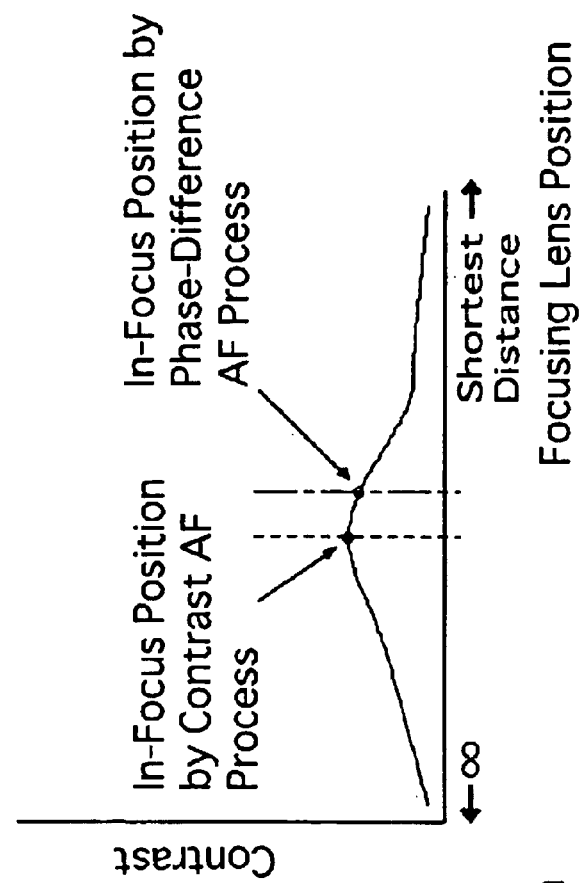
FIG. 5A shows a line graph showing a relationship between an in-focus position determined by the phase-difference detecting method and an in-focus position determined by the contrast detecting method when image contrast is high.
Figure 5B:
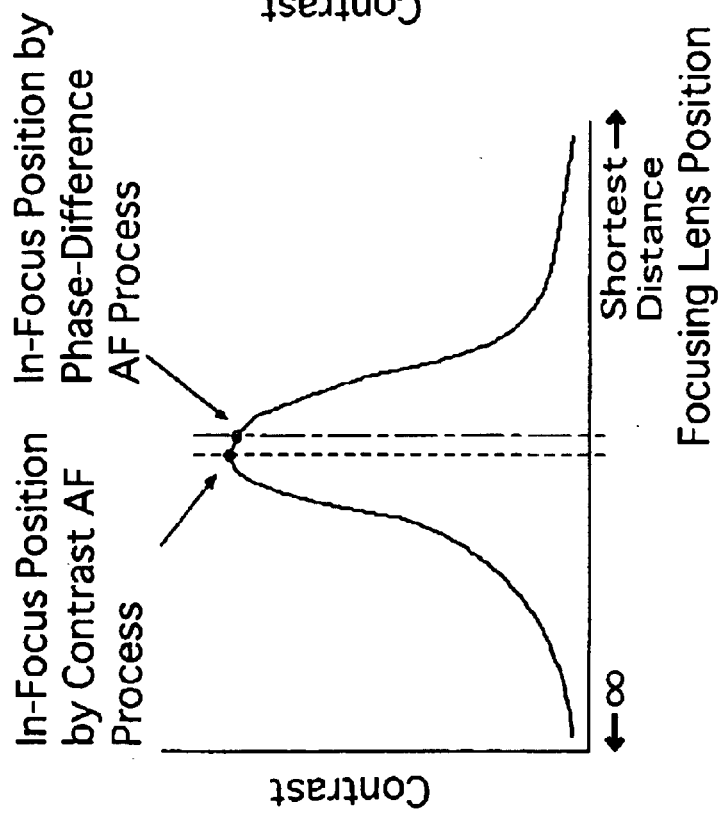
FIG. 5B shows a line graph showing a relationship between an in-focus position determined by the phase-difference detecting method and an in-focus position determined by the contrast detecting method when image contrast is low.

FIG. 5A shows a line graph showing a relationship between an in-focus position determined by the phase-difference detecting method and an in-focus position by the contrast detecting method in the case of a high-contrast object, and FIG. 6A shows a line graph showing a relationship between an in-focus position determined by the phase-difference detecting method, and a moving path of the focusing lens group 12 and an in-focus position thereof determined by the contrast detecting method in the case of a high-contrast object. FIG. 5B shows a line graph showing a relationship between an in-focus position determined by the phase-difference detecting method and an in-focus position by the contrast detecting method in the case of a low-contrast object, and FIG. 6B shows a line graph showing a relationship between an in-focus position determined by the phase-difference detecting method, and a moving path of the focusing lens group 12 and an in-focus position thereof determined by the contrast detecting method in the case of a low-contrast object. In each of FIGS. 5A through 6B, an in-focus position of the focusing lens group 12 which is determined by phase-difference detection type AF (hereinafter also referred to as "phase-difference in-focus position") is represented by a hollow circle, while an in-focus position of the focusing lens group 12 which is determined by contrast detection type AF (hereinafter also referred to as "contrast in-focus position") is represented by a filled circle. Since the contrast of an object image generally reaches a maximum at a precise in-focus position, the contrast in-focus position is closer to an actual in-focus position of the focusing lens group 12 than the phase-difference in-focus position, so that it is generally the case that the phase-difference in-focus position slightly deviates from an actual in-focus position of the focusing lens group 12. Additionally, FIGS. 5A through 6B show the fact that an in-focus position of the focusing lens group 12 can be determined with a high degree of accuracy for a high-contrast object by the phase-difference detecting method; the degree of accuracy decreases as the contrast of the object image decreases. Namely, FIGS. 5A through 6B show the fact that a deviation of the phase-difference in-focus position from an actual in-focus position of the focusing lens group 12 increases as the image contrast decreases.

In view of such a fact, in the present embodiment of the passive autofocus system, an autofocus process using the phase-difference detecting method is firstly carried out to determine the phase-difference in-focus position and the degree of reliability therein. If the degree of reliability in the phase-difference in-focus position is high, a position of the focusing lens group 12 which is positioned on the infinite ($\infty$) side from the phase-difference in-focus position by an amount of movement α is set as a position of commencement of an autofocus process using the contrast detecting method. On the other hand, if the degree of reliability in the phase-difference in-focus position is low, a position of the focusing lens group 12 which is positioned on the infinite ($\infty$) side from the phase-difference in-focus position by an amount of movement β is set as the position of commencement of the autofocus process using the contrast detecting method. The absolute value of the amount of movement β is greater than the absolute value of the amount of movement α, i.e., "$|\alpha|<|\beta|$".

Thereafter, the autofocus process using the contrast detecting method is carried out while moving the focusing lens group 12 stepwise from the position of commencement of the autofocus process in a direction toward the phase-difference in-focus position.

Figure 7:
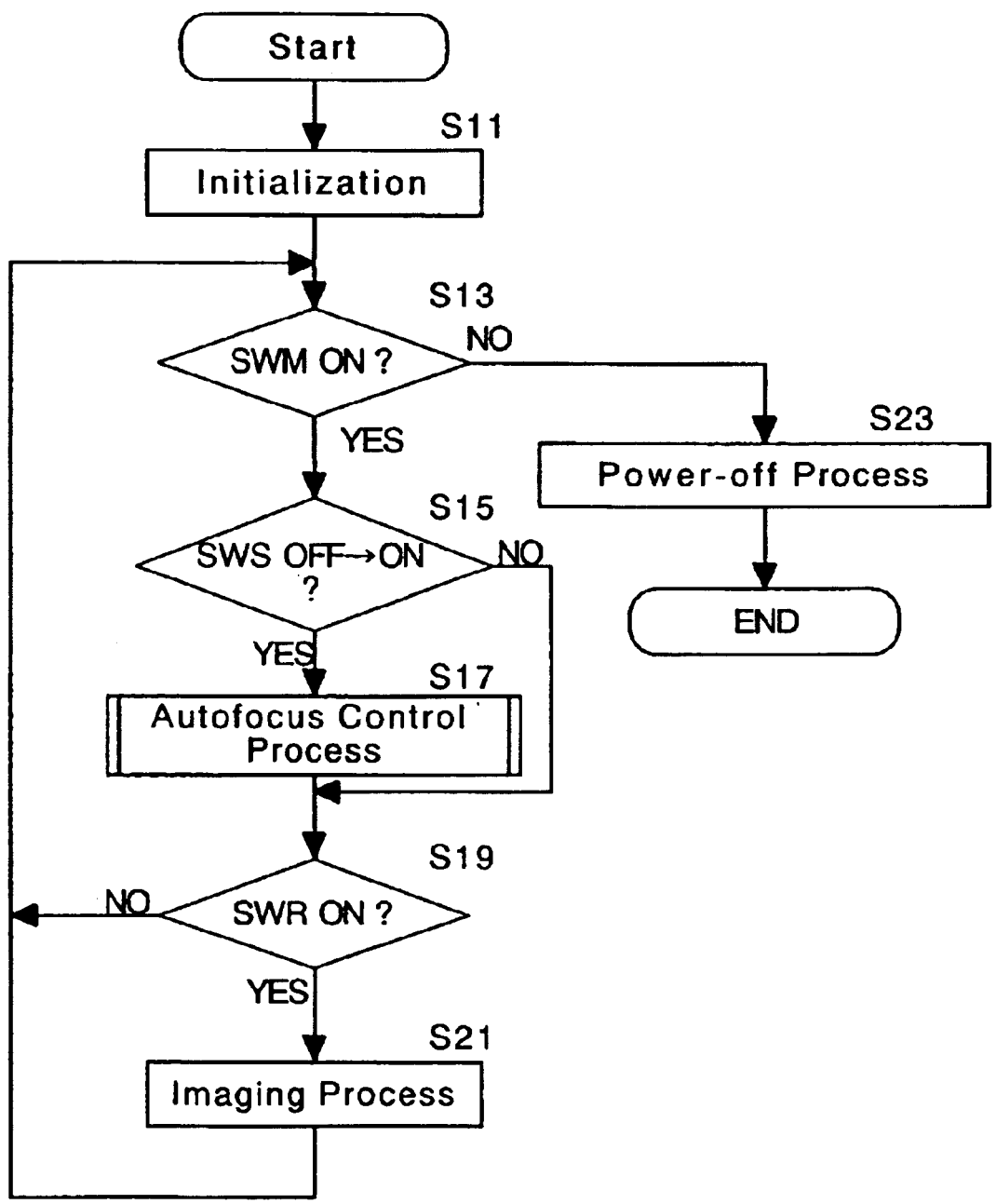
FIG. 7 is a flow chart of a main process of an autofocus process performed in the lens shutter type of electronic camera according to the present invention.
Figure 8:
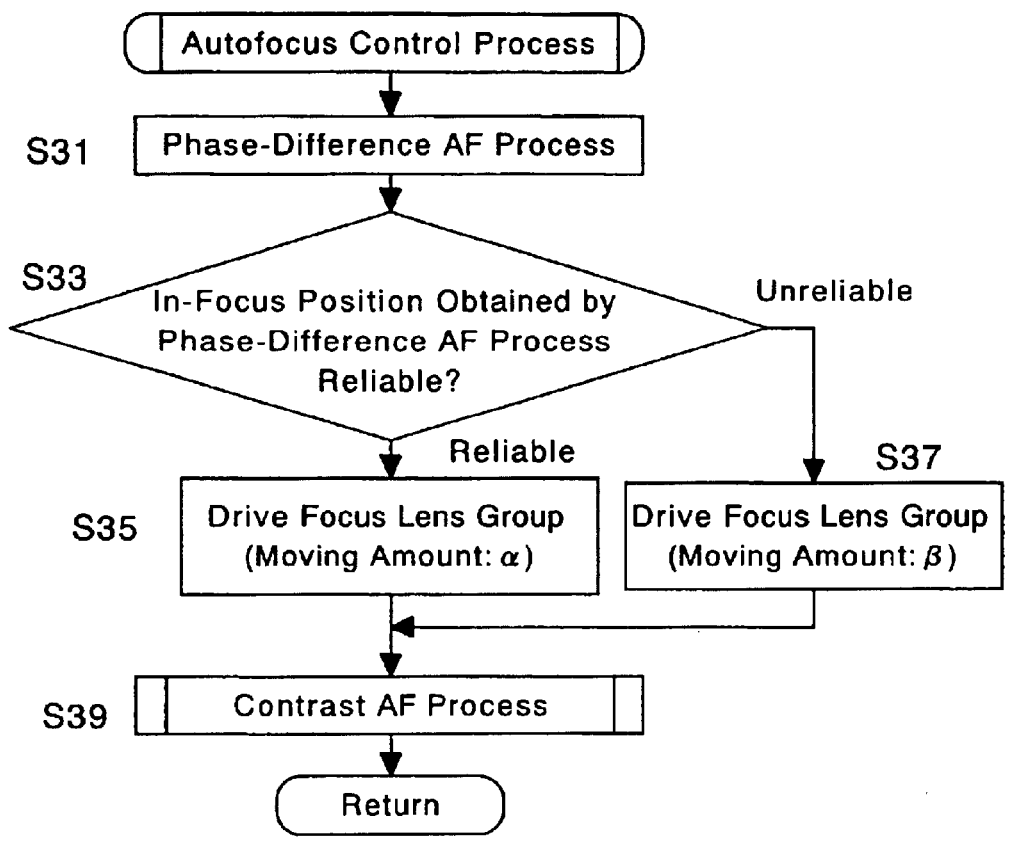
FIG. 8 is a flow chart of an autofocus control process included in the main process shown in FIG. 7.
Figure 9:
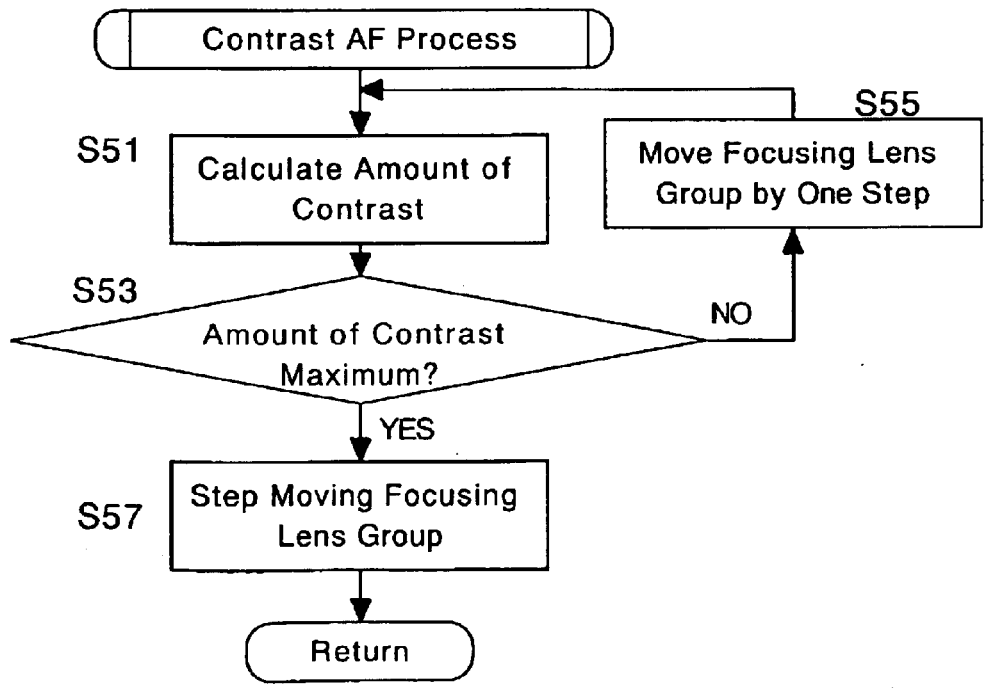
FIG. 9 is a flow chart of a contrast AF process included in the autofocus control process shown in FIG. 8.

The autofocus process by both the phase-difference detecting method and the contrast detecting method will be further discussed with reference to FIGS. 7 through 9. FIG. 7 shows a flow chart of a main process of the autofocus process according to the present invention. Control enters this main process immediately after the main power switch SWM is turned ON. In this particular embodiment, the electronic camera is set in AF lock mode in which an in-focus state is maintained while the photometering switch SWS remains ON after the autofocus process is completed following a switch-ON of the photometering switch SWS. The flow charts shown in FIGS. 7 and 9 include only operations and processes which are associated with the present invention.

Immediately after the main power switch SWM is turned ON, an initializing process for initializing hardware and software is performed (step S11). Subsequently, it is determined whether the main power switch SWM is ON (step S13). If the main power switch SWM is ON (if YES at step S13), operations at steps S15 through S21 are repeated as long as the main power switch SWM remains ON. Upon the main power switch SWM being turned OFF, control proceeds from step S13 to step S23 at which a power-off process is performed to end the main process.

The loop including operations at steps S13 through S21 is repeated as long as the main power switch SWM remains ON. This loop will be discussed hereinafter. Control waits for the main power switch SWM to be turned ON from an OFF state thereof (step S13). Upon the main power switch SWM being turned ON (if YES at step S13), it is determined whether the photometering switch SWS is turned ON from an OFF state thereof (step S15). If the photometering switch SWS is turned ON (if YES at step S15), a autofocus control process is performed to move the focusing lens group 12 to an in-focus position thereof (step S17). Subsequently, It is determined whether the release switch SWR is ON (step S19). If the release switch SWR is ON (if YES at step S19), an imaging process is performed (step S21), and control returns to step S13 after completion of the imaging process. If it is determined at step S19 that the release switch SWR is not ON (if NO at step S19), control returns to step S13.

If it is determined at step S15 that the photometering switch SWS is not yet turned ON from an OFF state thereof (if NO at step S15), control skips the autofocus control process at step S17 and proceeds to step S19.

The autofocus control process, which commences at step S17 immediately after the photometering switch SWS is turned ON from an OFF state thereof by a half-step depression of the release button, will be hereinafter discussed in detail with reference to the flow chart shown in FIG. 8.

In the autofocus control process, firstly the autofocus process using the phase-difference detecting method (phase-difference AF process) is performed (step S31). In the autofocus process using the phase-difference detecting method, the CPU 25 activates the phase-difference distance measuring device 31 to input picture signals of the two separate object images which are respectively formed on the reference area and the comparison area of the line sensor, determines correlation values between the two separate object images, and further determines a phase difference between the two separate object images from the correlation values to determine an in-focus position of the focusing lens group 12 (the phase-difference in-focus position). When determining the correlation values, the CPU 25 also determines the degree of reliability in the phase-difference in-focus position. This degree of reliability corresponds to the sum of the inclination angles (the sum of the absolute values, or the interposing angle of the two correlation lines) of the above described two correlation lines (see FIGS. 4A and 4B) which both form a V-shaped line graph (the point at which the two correlation lines intersect designates the minimum value of correlation, which is the point where the coincidence is maximum).

Subsequently, it is determined whether the phase-difference in-focus position obtained by the phase-difference detecting method is reliable (step 33). This reliability corresponds to the inclination angles of the above described two correlation lines. It is determined that the phase-difference in-focus position is reliable if the sum of the inclination angles of the two correlation lines is equal to or greater than a predetermined value and that the phase-difference in-focus position is unreliable if the sum of-the inclination angles of the two correlation lines is smaller than a predetermined value.

If it is determined at step S33 that the phase-difference in-focus position is reliable (if Reliable at step S33), a position of the focusing lens group 12 which is positioned on the infinite (∞) side from the phase-difference in-focus position by the amount of movement a is set as a position of commencement of the autofocus process using the contrast detecting method, and the focusing lens group 12 is moved to this position of commencement of the autofocus process using the contrast detecting method (step S35).

If it is determined at step S33 that the phase-difference in-focus position is unreliable (if Unreliable at step S33), a position of the focusing lens group 12 which is positioned on the infinite (∞) side from the phase-difference in-focus position by the amount of movement β is set as the position of commencement of the autofocus process using the contrast detecting method, and the focusing lens group 12 is moved to this position of commencement of the autofocus process using the contrast detecting method (step S37).

Subsequently, the autofocus process using the contrast detecting method (contrast AF process) is carried out while moving the focusing lens group 12 stepwise from the position of commencement of the autofocus process to move the focusing lens group 12 to the contrast in-focus position (step S39). Subsequently, control returns to the main process.

The contrast AF process, which is performed at step S39, will be hereinafter discussed in detail with reference to the flow chart shown in FIG. 9.

In the contrast AF process, firstly the CPU 25 activates the CCD 21 so that it captures an object image, and inputs contrast data from the DSP 23, and stores the current position of the focusing lens group 12 (i.e., the amount of contrast is calculated)(step S51).

Subsequently, it is determined whether a maximum amount of contrast has been detected (step S53). If the amount of contrast has not reached a maximum (if NO at step S53), the focusing lens group 12 is moved by one step (step S55), and the operation at step S51 is again performed. Accordingly, the loop including the operations at steps S51, S53 and S55 is repeated until the amount of contrast reaches a maximum, i.e., until the peak contrast intensity (the contrast in-focus position) is obtained.

If it is determined at step S53 that the amount of contrast has reached a maximum (if YES at step S53), the CPU 25 actuates the focusing lens actuator 26 to move the focusing lens group 12 to the position (the contrast in-focus position), at which the peak contrast intensity is obtained, and the CPU 25 stops the driving of the focusing lens group 12 (step S57). Subsequently, control returns to the main process.

As can be understood from the above descriptions, it takes a short time to complete the phase-difference AF process when the degree of reliability is high, while the contrast is detected in a wide range of movement of the focusing lens group to thereby make it possible to detect the peak contrast intensity with reliability though it takes a relatively long time when the degree of reliability is low.

Although the contrast AF process is classified into two conditions: a reliable condition and an unreliable condition, in the above illustrated embodiment, the reliability in the contrast AF process can be classified into more than two conditions to change the position of commencement of the autofocus process using the contrast detecting method in stages, or the position of commencement of the autofocus process can be varied continuously in accordance with the degree of reliability in the contrast AF process. Moreover, the position of commencement of the autofocus process using the contrast detecting method can be set at a position closer to the minimum distance side than the phase-difference in-focus position, wherein the focusing lens group 12 can be driven in a direction toward the contrast in-focus position.

As can be understood from the foregoing, according to the present invention, a moving range of the focusing lens group by the contrast detecting method is adjusted to decrease as the degree of reliability in the phase-difference in-focus position obtained by the passive phase-difference detecting method increases. Therefore, it only takes a short time to detect the peak contrast intensity when the degree of reliability is high, while it is possible to detect the peak contrast intensity with reliability even when the degree of reliability is low.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An autofocus system for a camera, comprising:
   a contrast focus detector which detects a position of a focusing lens group, at which a contrast of an object image which passes through a photographing optical system reaches a maximum while moving said focusing lens group via a lens driver, said contrast focus detector defining said position of said focusing lens group at which said contrast of said object image reaches a maximum as a contrast in-focus position;
   a phase-difference focus detector which separates a light bundle of said object image into two light bundles so that said two light bundles are formed as two object images on a light-receiving element to detect a phase difference between said two object images formed thereon, said phase-difference focus detector defining a position of said focusing lens group at which an in-focus state is obtained for said object as a phase-difference in-focus position; and
   a controller for moving said focusing lens group via said lens driver to one of said phase-difference in-focus position and said contrast in-focus position, wherein said controller adjusts a moving range of said focusing lens group for detecting said contrast by said contrast focus detector in accordance with a degree of reliability of said phase-difference in-focus position,
   wherein said reliability corresponds to a minimum value of a correlation function of said two objects images,
   wherein said controller moves said focusing lens group to a start position spaced from said phase-difference in-focus position by a first moving amount when said minimum value is smaller than a predetermined value, and by a second moving amount when said minimum value is one of equal to and greater than said predetermined value, so as to detect said contrast while moving said focusing lens group from said start position in a direction toward said phase-difference in-focus position, the absolute value of said second moving amount being greater than the absolute value of said first moving amount.

2. An autofocus system for a camera, comprising:
   a contrast focus detector which detects a position of a focusing lens group, at which a contrast of an object image which passes through a photographing optical system reaches a maximum while moving said focusing lens group via a lens driver, said contrast focus detector defining said position of said focusing lens group at which said contrast of said object image reaches a maximum as a contrast in-focus position;
   a phase-difference focus detector which separates a light bundle of said object image into two light bundles so that said two light bundles are formed as two object images on a light-receiving element to detect a phase difference between said two object images formed thereon, said phase-difference focus detector defining a position of said focusing lens group at which an in-focus state is obtained for said object as a phase-difference in-focus position; and
   a controller for moving said focusing lens group via said lens driver to one if said phase-difference in-focus position and said contrast in-focus position, wherein said controller adjusts a moving range of said focusing lens group for detecting said contrast by said contrast focus detector in accordance with a degree of reliability of said phase-difference in-focus position,
   wherein said reliability corresponds to the inclination angle formed by a correlation line and a horizontal line,
   wherein the intersection of said correlation line and said horizontal line corresponds to a minimum value of a correlation function of said two object images,
   wherein said controller moves said focusing lens group to a start position away from said phase-difference in-focus position by a first moving amount in the case where said minimum value is smaller than a predetermined value, and by a second moving amount in the case where said minimum value is one of equal to and greater than said predetermined value, so as to detect said contrast while moving said focusing lens group from said start position in a direction toward said phase-difference in-focus position, the absolute value of said second moving amount being greater than the absolute value of said first moving amount.

3. The autofocus system according to claim 1, wherein a direction of movement of said focusing lens group by each of said first moving amount and said second moving amount is a direction toward infinity from said phase-difference in-focus position.

4. The autofocus system according to claim 1, wherein a direction of movement of said focusing lens group by each of said first moving amount and said second moving amount is a direction toward the minimum photographing distance position from said phase-difference in-focus position.

5. The autofocus system according to claim 1, wherein said phase-difference focus detector is provided as a unit which is independent of said contrast focus detector.

6. An autofocus system, comprising:

a contrast focus detector which detects a position of a focusing lens group, at which a contrast of an object image which passes through a photographing optical system reaches a maximum while moving said focusing lens group via a lens driver, said contrast focus detector defining said position of said focusing lens group at which said contrast of said object image reaches a maximum as a contrast in-focus position;

a phase-difference focus detector which separates a light bundle of said object image into two light bundles so that said two light bundles are formed as two object images on a light-receiving element to detect a phase difference between said two object images formed thereon, said phase-difference focus detector defining a position of said focusing lens group at which an in-focus state is obtained for said object as a phase-difference in-focus position; and a controller for moving said focusing lens group via said lens driver to one of said phase-difference in-focus position and said contrast in-focus position, wherein said controller adjusts a distance from a position of said focusing lens group to said phase-difference in-focus position, for detecting said contrast by said contrast focus detector in accordance with a degree of reliability of said phase-difference in-focus position, wherein said reliability corresponds to a minimum value of a correlation function of said two object images, wherein said controller moves said focusing lens group to a start position spaced from said phase-difference in-focus position by a first moving amount when said minimum value is smaller than a predetermined value, and by a second moving amount when said minimum value is one of equal to and greater than said predetermined value, so as to detect said contrast while moving said focusing lens group from said start position in a direction toward said phase-difference in-focus position, the absolute value of said second moving amount being greater than the absolute value of said first moving amount.

7. An autofocus method, comprising:

separating a light bundle of an object image into two light bundles so that said two light bundles are formed as two object images on a light-receiving element to detect a phase difference between the two object images formed thereon;

defining a position of a focusing lens group at which an in-focus state is obtained for said object as a phase-difference in-focus position;

detecting a position of the focusing lens group, at which a contrast of an object image which passes through a photographing optical system reaches a maximum while moving said focusing lens group;

commencing a lens driving operation, wherein a distance from said phase-difference in-focus position is controlled in accordance with a degree of reliability of said phase-difference in-focus position, and defining said position of said focusing lens group at which said contrast of said object image reaches a maximum as a contrast in-focus position, wherein said reliability corresponds to a minimum value of a correlation function of said two object images, wherein said focusing lens group is moved to a start position spaced from said phase-difference in-focus position by a first moving amount when said minimum value is smaller than a predetermined value, and by a second moving amount when said minimum value is one of equal to and greater than said predetermined value, so as to detect said contrast while moving said focusing lens group from said start position in a direction toward said phase-difference in-focus position, the absolute value of said second moving amount being greater than the absolute value of said first moving amount.

8. The autofocus system according to claim 2, wherein said phase-difference focus detector is provided as a unit which is independent of said contrast focus detector.

9. An autofocus system, comprising:

a contrast focus detector which detects a position of a focusing lens group, at which a contrast of an object image which passes through a photographing optical system reaches a maximum while moving said focusing lens group via a lens driver, said contrast focus detector defining said position of said focusing lens group at which said contrast of said object image reaches a maximum as a contrast in-focus position;

a phase-difference focus detector which separates a light bundle of said object image into two light bundles so that said two light bundles are formed as two object images on a light-receiving element to detect a phase difference between said two object images formed thereon, said phase-difference focus detector defining a position of said focusing lens group at which an in-focus state is obtained for said object as a phase-difference in-focus position; and a controller for moving said focusing lens group via said lens driver to one of said phase-difference in-focus position and said contrast in-focus position, wherein said controller adjusts a distance from a position of said focusing lens group to said phase-difference in-focus position, for detecting said contrast by said contrast focus detector in accordance with a degree of reliability of said phase-difference in-focus position, wherein said reliability corresponds to the inclination angle formed by a correlation line and a horizontal line, wherein the intersection of said correlation line and said horizontal line corresponds to a minimum value of a correlation function of said two object images, wherein said controller moves said focusing lens group to a start position spaced from said phase-difference in-focus position by a first moving amount when said inclination angle is one of equal to and greater than a predetermined value, and by a second moving amount when said inclination angle is smaller than said predetermined value, so as to detect said contrast while moving said focusing lens group from said start position in a direction toward said phase-difference in-focus position, the absolute value of said second moving amount being greater than the absolute value of said first moving amount.

10. An autofocus method, comprising:

separating a light bundle of an object image into two light bundles so that said two light bundles are formed as two object images on a light-receiving element to detect a phase difference between the two object images formed thereon;

defining a position of a focusing lens group at which an in-focus state is obtained for said object as a phase-difference in-focus position;

detecting a position of the focusing lens group, at which a contrast of an object image which passes through a photographing optical system reaches a maximum while moving said focusing lens group;

commencing a lens driving operation, wherein a distance from said phase-difference in-focus position is controlled in accordance with a degree of reliability of said phase-difference in-focus position, and defining said position of said focusing lens group at which said contrast of said object image reaches a maximum as a contrast in-focus position, wherein said reliability corresponds to the inclination angle formed by a correlation line and a horizontal line, wherein the intersection of said correlation line and said horizontal line corresponds to a minimum value of a correlation function of said two object images, wherein said focusing lens group is moved to a start position spaced from said phase-difference in-focus position by a first moving amount when said inclination angle is one of equal to and greater than a predetermined value, and by a second moving amount when said inclination angle is smaller than said predetermined value, so as to detect said contrast while moving said focusing lens group from said start position in a direction toward said phase-difference in-focus position, the absolute value of said second moving amount being greater than the absolute value of said first moving amount.

11. The autofocus system according to claim 2, wherein a direction of movement of said focusing lens group by each of said first moving amount and said second moving amount is a direction toward infinity from said phase-difference in-focus position.

12. The autofocus system according to claim 2, wherein a direction of movement of said focusing lens group by each of said first moving amount and said second moving amount is a direction toward the minimum photographing distance position from said phase-difference in-focus position.

13. The autofocus system according to claim 6, wherein a direction of movement of said focusing lens group by each of said first moving amount and said second moving amount is a direction toward infinity from said phase-difference in-focus position.

14. The autofocus system according to claim 6, wherein a direction of movement of said focusing lens group by each of said first moving amount and said second moving amount is a direction toward the minimum photographing distance position from said phase-difference in-focus position.

15. The autofocus system according to claim 7, wherein a direction of movement of said focusing lens group by each of said first moving amount and said second moving amount is a direction toward infinity from said phase-difference in-focus position.

16. The autofocus system according to claim 7, wherein a direction of movement of said focusing lens group by each of said first moving amount and said second moving amount is a direction toward the minimum photographing distance position from said phase-difference in-focus position.

17. The autofocus system according to claim 9, wherein a direction of movement of said focusing lens group by each of said first moving amount and said second moving amount is a direction toward infinity from said phase-difference in-focus position.

18. The autofocus system according to claim 9, wherein a direction of movement of said focusing lens group by each of said first moving amount and said second moving amount is a direction toward the minimum photographing distance position from said phase-difference in-focus position.

19. The autofocus system according to claim 10, wherein a direction of movement of said focusing lens group by each of said first moving amount and said second moving amount is a direction toward infinity from said phase-difference in-focus position.

20. The autofocus system according to claim 10, wherein a direction of movement of said focusing lens group by each of said first moving amount and said second moving amount is a direction toward the minimum photographing distance position from said phase-difference in-focus position.

* * * * *